United States Patent [19]

Stanley

[11] Patent Number: 5,624,509
[45] Date of Patent: Apr. 29, 1997

[54] WHEEL TRACTION DEVICE

[76] Inventor: Corby H. Stanley, 1766 Balaclava Street, Vancouver, British Columbia, Canada, V6K 4B7

[21] Appl. No.: 147,435

[22] Filed: Nov. 5, 1993

Related U.S. Application Data

[63] Continuation of Ser. No. 956,339, Oct. 5, 1992, abandoned, which is a continuation-in-part of Ser. No. 812,013, Dec. 23, 1991, abandoned.

[51] Int. Cl.$^6$ ............................................. B60C 27/12
[52] U.S. Cl. ................... 152/213 R; 152/175; 152/187; 152/221
[58] Field of Search ................... 152/167, 170, 152/173–177, 185, 187–188, 208, 210, 213 R, 213 A, 221

[56] References Cited

U.S. PATENT DOCUMENTS

| | | | |
|---|---|---|---|
| 627,483 | 6/1899 | Comly | 152/175 |
| 797,200 | 8/1905 | Haas | 152/167 |
| 1,188,739 | 6/1916 | Davis | 152/187 |
| 1,908,808 | 5/1933 | Auciunas | 152/177 |
| 2,345,518 | 3/1944 | Wendel | 152/175 |
| 2,392,577 | 1/1946 | Castricum | 152/177 |
| 2,608,232 | 8/1952 | Kennedy | 152/177 |
| 2,609,026 | 8/1952 | Luchsinger-Caballero | 152/176 |
| 2,682,907 | 7/1954 | Krueger | 152/208 |
| 2,777,497 | 1/1957 | Hildebrandt | 152/175 |
| 2,856,979 | 10/1958 | Branch | 152/175 |
| 3,335,776 | 8/1967 | Peterson . | |

FOREIGN PATENT DOCUMENTS

| | | | |
|---|---|---|---|
| 1237051 | 5/1988 | Canada . | |
| 0044696 | 10/1931 | Denmark | 152/175 |
| 0537359 | 10/1931 | Germany | 152/173 |
| 0179923 | 12/1935 | Germany | 152/175 |
| 0881612 | 7/1949 | Germany | 152/173 |
| 0527586 | 5/1955 | Italy | 152/177 |
| 0545860 | 7/1956 | Italy | 152/176 |
| 0301111 | 12/1988 | Japan | 152/208 |
| 0249503 | 10/1989 | Japan | 152/185 |
| 0184107 | 8/1922 | United Kingdom | 152/175 |
| 8100831 | 4/1981 | WIPO | 152/177 |

*Primary Examiner*—Michael W. Ball
*Assistant Examiner*—Francis J. Lorin
*Attorney, Agent, or Firm*—Elbie R. De Kock

[57] ABSTRACT

A removable traction device (10) for a tire (14) on a vehicle comprises an elongated member (12) for fitting around the tire (14) along the ground-engaging tread of the tire. The elongate member (12) has an inner surface for contact with the ground-engaging tread of the tire (14) and an outer surface which is provided with traction assistance means thereon. In one embodiment, the elongate member is elastic or stretchable in its longitudinal direction. According to another specific embodiment, the elongated member is in the form of an endless belt and is provided with a circumferentially extending rib (18) on its inner surface for forming a stretch fit around the tire (14). In another embodiment, the member (12) is provided with a plurality of openings (22) between its inner and its outer surfaces.

9 Claims, 2 Drawing Sheets

5,624,509

WHEEL TRACTION DEVICE

CROSS REFERENCE TO RELATED APPLICATION

This application is a continuation of U.S. patent application Ser. No. 07/956,339, filed Oct. 5, 1992, now abandoned, which in turn is a continuation-in-part of U.S. patent application Ser. No. 07/812,013 filed Dec. 23, 1991, now abandoned, the contents of each of the aforementioned applications being incorporated herein by reference.

FIELD OF THE INVENTION

This invention relates to a traction device for a motor vehicle tire, in particular, for improving the traction between the tire and a slippery or wet surface.

BACKGROUND OF THE INVENTION

Certain tires are usually not suitable for use in snowy road conditions and it has been the practice to put standard chains or cable chains on tires for use on snow covered surfaces. The fitting of such cables or chains is cumbersome and time consuming. An alternative is to provide specially designed snow tires which can be fitted to a vehicle for use during winter conditions but these tires need to be removed and replaced with normal tires for normal use.

Other types of traction devices are also known, such as described in U.S. Pat. No. 3,335,776 which describes an expendable traction device which comprises a band of flexible material which is fitted around the tire and bonded to the tire by means of a pressure adhesive.

In all the prior art of which the applicant is aware, the traction devices, although flexible, are not elastic or stretchable in the longitudinal direction, i.e. circumferentially of the tire around which the traction device is fitted. The applicant has found that by providing a traction device which is elastic at least in the longitudinal direction but preferably also in other directions, and which is fitted onto a tire by means of a stretch fit, provides a traction device which hugs the tire and resists becoming dislocated from the tire during use and which, on the other hand, is easily installed on a tire, without the necessity of lifting the tire from the ground surface.

The applicant has also found that it is advantageous to provide openings in the traction device which expose the tread of the tire therethrough.

SUMMARY OF THE INVENTION

According to the invention, there is provided a removable traction device for a tire, comprising an elongate member for fitting around the tire along the ground-engaging tread of the tire and having an inner surface for contact with the ground-engaging tread of the tire and an outer surface for ground contact, wherein at least one opening is provided in the member between said inner and outer surfaces thereof.

Also according to the invention, there is provided a removable traction device for a tire comprising an annular member for fitting around the tire and having an inner surface for contact with the ground-engaging tread of the tire and an outer surface for ground contact and further comprising a circumferentially extending rib on said inner surface.

Further according to the invention, there is provided in combination, a pneumatic tire having sidewalls and a ground-engaging tread between said sidewalls and a removable traction device for said tire comprising an annular member for fitting around said tire and having an inner surface for contact with the ground-engaging tread of the tire and an outer surface for ground contact, wherein said tire and said traction device are provided with mating formations for locating the traction device in position on the tire.

Further objects and advantages of the invention will become apparent from the description of a preferred embodiment of the invention below.

BRIEF DESCRIPTION OF DRAWINGS

The invention will now be described by way of an example, with reference to the accompanying drawings, in which.

DETAILED DESCRIPTION OF PREFERRED EMBODIMENT

Figure 1:
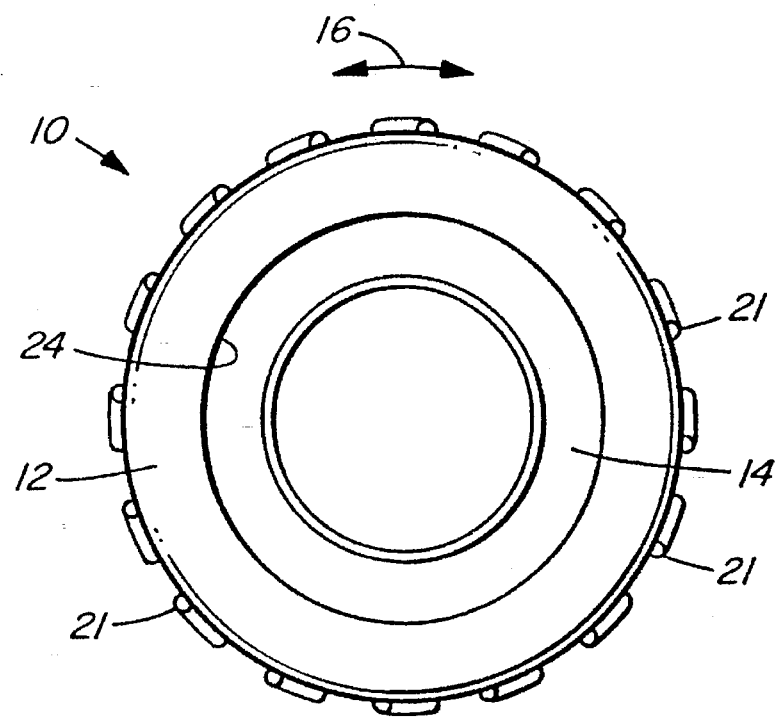
FIG. 1 is a side view of a traction device, according to the invention, shown mounted on a tire.

In FIGS. 1 to 4, reference numeral 10 generally indicates a traction device which is in the form of an annular member or cover 12 for fitting around a vehicle tire 14 over the traction surface of the tire 14. The cover 12 effectively forms an outer skin around the tire 14, covering the tread 15 of the tire 14 and part of the sidewalls 17 of the tire 14. The cover 12 has an inner surface 12.1 and an outer surface 12.2.

The cover 14 is preferably of an elastomeric material, such as rubber or a synthetic rubber or any other suitable synthetic plastics material. In particular, the cover is elastic in the longitudinal or circumferential direction, as indicated by the arrow 16 in FIG. 1. A material which has been found suitable for the cover 12 is the type of butyl rubber from which commercially available inner tubes are made and which is stretchable in all directions Typically, the cover 12 may be of a thickness in the order of ⅛ inch, such as the thickness of a standard type inner tube, MR 14/15, to fit fourteen or fifteen inch rims.

The purpose of the elastomeric property of the cover in the circumferential direction is to assist the grip of the cover 12 on the tire 14, to counteract dislodgement or removal of the cover 12 during use, for example, as a result of centrifugal forces generated by the rotating tire.

The cover 12 is provided in different sizes to fit different sizes of commercially available tires. The arrangement is preferably such that, in each instance, the cover will form a stretch fit around the particular tire size for which it is intended.

Figure 3:
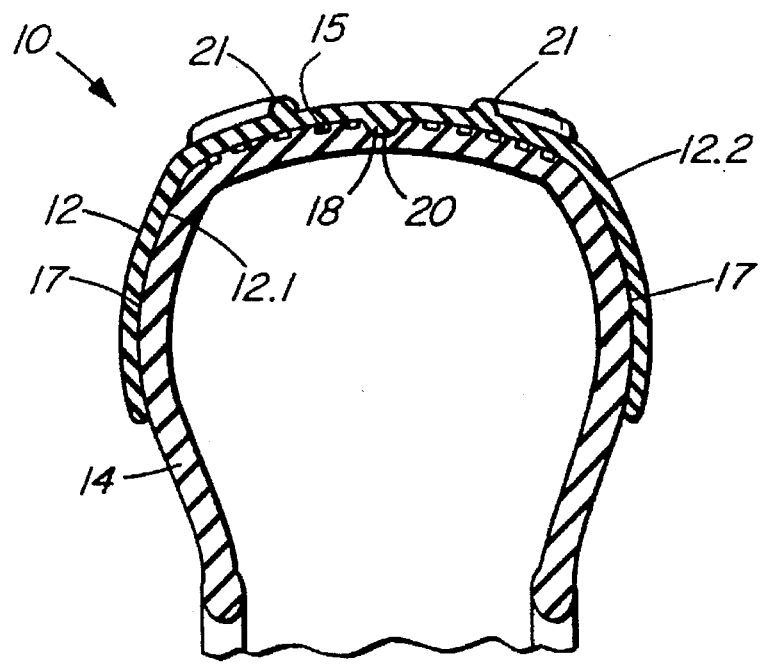
FIG. 3 is a section taken along the lines III—III in FIG. 2.
Figure 4:
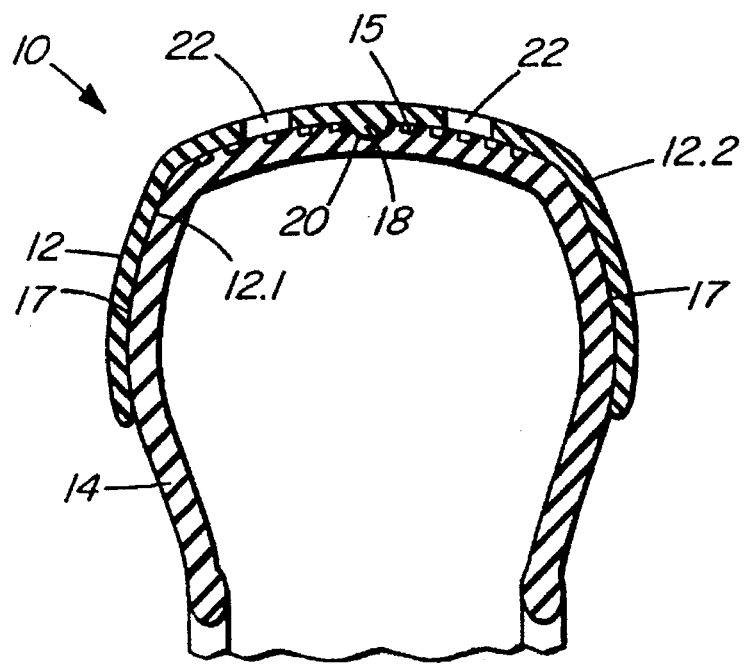
FIG. 4 is a section taken along the lines IV—IV in FIG. 2.

In order to assist this gripping action, the cover 12 is provided with a circumferential rib 18 extending along the centre thereof. The rib 18 is elastic in its longitudinal direction and is pre-stressed for a particular tire size. The rib 18 may be integrally moulded with the cover 12, as shown in FIGS. 3 and 4, or it may comprise a cord of a suitable stretchable material, such as natural rubber or neoprene rubber, which is attached by means of a suitable adhesive to the inner surface 12.1 of the cover 12. A cord of ¼ inch diameter has been found to be satisfactory. A wetsuit repair glue has been found to be a suitable adhesive because of its properties of bonding rubber or neoprene very well under stretch conditions. To improve the bond, the inner surface 12.1 of the cover 12 is treated with an emery cloth or abrasive to give a strong bond between the rib 18 and the cover 12. To increase the bonding surface, the cord may be cut in half longitudinally.

In making a prototype of the cover 12 by cutting away the central annular portion of a conventional inner tube such as the type referred to above, the talc from the inner tube was washed with methyl hydrate before the surface treatment.

The rib 18 also assists in locating the cover 12 in position on the tire 14. This is particularly so if the cover 12 is used with a commercially available tire such as produced by GOODYEAR under the name of AQUATRED, which tire is provided with a centrally located circumferentially extending recess 20, such as shown in FIGS. 3 and 4.

Apart from the above-described embodiment where the cover 12 is intended for use with any commercially available tire or with a tire having a circumferential groove, it is envisaged that tire and cover combinations may be manufactured in which the tire and cover are provided with mating formations for locating the cover in position on the tire and for assisting the grip of the cover on the tire. For example, a plurality of recesses may be provided on the tire to engage with mating projections on the cover.

Figure 2:
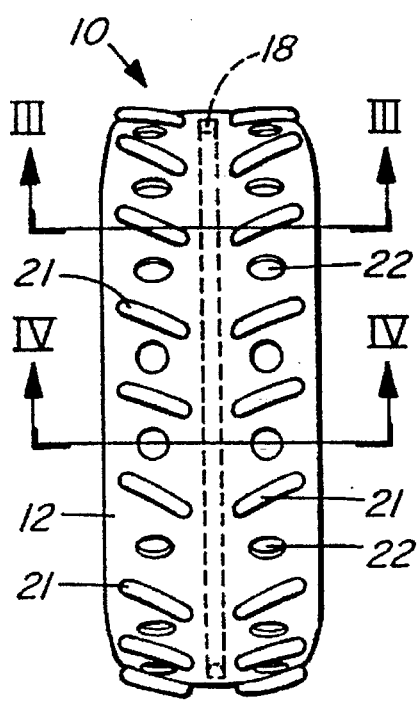
FIG. 2 is an end view of the traction device of FIG. 1.

As shown in FIG. 2, the cover 12 is provided with traction assistance means in the form of a plurality of transverse ridges or ribs 21. The ribs 21 may be integrally moulded with the cover 12 or alternatively the ribs 21 may be attached by means of a suitable adhesive. If desired, the ribs 21 may be arranged to conform with a groove pattern of the tread of a particular tire, to enhance the grip of the cover 12 on the tire. In the present example, the ribs 21 are arranged in transverse directions, to fit the grooves on the tread of a GOODYEAR AQUATRED tire and, in particular, to coincide with every fourth transverse groove of the tread of the tire.

A suitable material for the ribs 21 has been found to be neoprene rubber cord with a diameter of ¼ inch, which has been cut in half longitudinally. Alternatively, the ribs 21 may be of a natural rubber cord. A suitable size has been found to be a rubber cord of ⅜ inch diameter which has been cut in half longitudinally.

Holes 22 are provided between the ribs 21. The holes 22 serve two purposes: i) the holes provide a means to allow snow particles to escape, should snow accumulate between the sidewall 17 of the tire 14 and the cover 12, and ii) they provide an opportunity for the tread of the tire 14 to work with the traction device 10 to provide better traction.

It is also envisaged to thicken the circumferential edges 24 of the cover 12 to enhance the gripping of the cover 12 on the tire 14.

In a further embodiment of the invention, the ribs 21 cross members may be provided with an abrasive material such as a CARBORUNDUM™ abrasive or chopped wire embedded therein. As the abrasive particles on the surface wear during use, the upper surface of the ribs 21 will wear away and expose new abrasive particles for friction contact with the ground surface.

It is expected that the traction device 10 will replace the use of cumbersome articles, such as snow chains or the need to change to snow tires in wintry conditions. This will allow a motorist to make use of all-season tires with a set of traction devices 10, therefore dispensing with the need to change tires.

The traction device 10 is easily fitted to the wheel of a car by simply placing the device 10 over the upper part of the tire 14 not touching the ground surface, so that it hangs down towards the ground stretched over the upper portion of the tire and then driving the car forward slightly so that the rest of the device can be installed onto the tire 14. To remove the traction device 10, the reverse procedure is followed by first removing the device 10 from the top part of the tire and then moving the car forward or rearward to release the bottom part of the traction device 10.

It will be appreciated that the traction assistance means can be adapted to suit different road conditions as well as different types of vehicles, such as buses, trucks, automobiles, etc.

It is envisaged that the traction device according to the invention can be used on not only light vehicles such as automobiles, vans, etc., but also on heavier vehicles, such as trucks and buses.

While only preferred embodiments of the invention have been described herein in detail, the invention is not limited thereby and modifications can be made within the scope of the attached claims.

What is claimed is:

1. A removable traction device for a tire comprising an annular member of an elastomeric material for fitting around the tire in a stretch fit, said annular member having a thickness whereby it is easily stretchable for attachment in a stretch fit to a tire seated on a vehicle wheel and having an inner surface for contact with the ground-engaging tread of the tire and an outer surface for ground contact, wherein at least one opening is provided between said inner and outer surfaces and further comprising a circumferentially extending rib on said inner surface, said rib being elastic in its longitudinal direction for attaching the annular member to the tire; and traction assistance means on said outer surface in the form of transverse ribs spaced along the circumferential directing of the annular member and standing proud of the outer surface of the annular member.

2. The traction device according to claim 1, wherein a plurality of openings are provided between said inner and outer surfaces.

3. The traction device according to claim 2, wherein said openings are spaced along the circumferential direction of the annular member.

4. The traction device according to claim 3, wherein two rows of said circumferentially spaced openings are provided, the rows being spaced transversely of said circumferential direction.

5. The traction device according to claim 1, wherein a plurality of said openings are provided between the inner and outer surfaces, the openings being interspaced between said ribs.

6. The traction device according to claim 1 wherein said circumferentially extending rib is located centrally of said annular member.

7. In combination, a pneumatic tire having sidewalls and a ground-engaging tread between said sidewalls and a removable traction device for said tire comprising an annular member of an elastomeric material for fitting around the tire in a stretch fit, said annular member having a thickness whereby it is easily stretchable for attachment in a stretch fit to a tire seated on a vehicle wheel and having an inner surface for contact with the ground-engaging tread of the tire and an outer surface for ground contact, wherein at least one opening is provided between said inner and outer surfaces, wherein said tire and said traction device are provided with mating formations for locating the traction device in position on the tire; and wherein said traction device further comprises traction assistance means on said outer surface in the form of transverse ribs spaced along the circumferential direction of the annular member.

8. The combination according to claim 7, wherein said mating formations comprise a circumferential rib on said inner surface of said traction device and a mating circumferential groove on the tire.

9. The combination according to claim 8, wherein said circumferentially extending rib is elastic in its longitudinal direction.

* * * * *